US009630187B2

(12) United States Patent
Chien et al.

(10) Patent No.: US 9,630,187 B2
(45) Date of Patent: Apr. 25, 2017

(54) DIELECTROPHORETIC PARTICLE CONCENTRATOR AND CONCENTRATION WITH DETECTION METHOD

(71) Applicant: Industrial Technology Research Institute, Hsinchu (TW)

(72) Inventors: Liang-Ju Chien, Kaohsiung (TW); Chi-Han Chiou, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/302,443

(22) Filed: Jun. 12, 2014

(65) Prior Publication Data

US 2014/0291154 A1 Oct. 2, 2014

Related U.S. Application Data

(62) Division of application No. 12/763,180, filed on Apr. 19, 2010, now Pat. No. 8,795,501.

(30) Foreign Application Priority Data

Jan. 12, 2010 (TW) ............................... 99100678 A

(51) Int. Cl.
*G01N 27/447* (2006.01)
*B03C 5/00* (2006.01)
*B03C 5/02* (2006.01)

(52) U.S. Cl.
CPC .............. *B03C 5/005* (2013.01); *B03C 5/026* (2013.01); *B03C 2201/26* (2013.01)

(58) Field of Classification Search
CPC .... G01N 27/447; G01N 27/221; B03C 5/005; B01D 57/02
See application file for complete search history.

(56) References Cited

U.S. PATENT DOCUMENTS

2002/0100714 A1* 8/2002 Staats ............................. 210/85
2004/0011650 A1* 1/2004 Zenhausern et al. .......... 204/547
2004/0163955 A1* 8/2004 Miles et al. .................. 204/450
2008/0067068 A1* 3/2008 Li ................................. 204/451
2010/0109686 A1* 5/2010 Zhe ....................... G01M 13/02 324/698
2011/0272281 A1* 11/2011 Plecis ............. G01N 27/44752 204/451

FOREIGN PATENT DOCUMENTS

WO WO 2007/088517 * 8/2007
WO WO 2010/052387 * 5/2010

* cited by examiner

*Primary Examiner* — Alexander Noguerola
(74) *Attorney, Agent, or Firm* — Jianq Chyun IP Office

(57) ABSTRACT

A concentration method of dielectrophoretic particles includes: providing a fluid pipe structure, wherein the fluid pipe structure has a protrudent structure lateral protruding inwardly so as to form a line-like gate; making a fluid containing particles to be measured flow through the fluid pipe structure; and applying an electrical field through the line-like gate so as to produce a dielectrophoresis force to concentrate the particles to be measured.

4 Claims, 10 Drawing Sheets

(a)

(b)

DIELECTROPHORETIC PARTICLE CONCENTRATOR AND CONCENTRATION WITH DETECTION METHOD

CROSS-REFERENCE TO RELATED APPLICATION

This application is a divisional application of and claims the priority benefit of a prior application Ser. No. 12/763,180, filed on Apr. 19, 2010, now pending. The prior application Ser. No. 12/763,180 claims the priority benefit of Taiwan application serial no. 99100678, filed on Jan. 12, 2010. The entirety of each of the above-mentioned patent applications is hereby incorporated by reference herein and made a part of this specification.

BACKGROUND OF THE INVENTION

1. Field of the Invention

The present invention generally relates to a dielectrophoretic particle concentrator and a concentration with detection method, and more particularly, to a dielectrophoretic particle concentrator and concentration with detection method having high efficiency.

2. Description of Related Art

In our lives, a number of trace germs exists in food and drinking water. In fact, the medical blood testing and urine testing are also conducted targeting many items of trace germs. Many of the biochips developed in recent years are designed to simplify the processes of trace measurement, among which a dielectrophoresis mechanism (DEP mechanism) is used to concentrate the trace particles in a specimen fluid so as to facilitate the measurements. Particles with different dielectric properties act under dielectrophoresis force (DEP force) so that the drifted and floating particles in a flowing fluid are gathered at a detection region to be detected.

The above-mentioned DEP force appears due to an existing electrical field gradient, i.e., the DEP force is produced under an environment with a non-uniformed electrical field. FIG. 1 is a diagram showing the dielectrophoresis mechanism. Referring to FIG. 1(*a*), a flat-plate electrode 64 and a localized electrode 62 herein are applied by a voltage of an AC power or a DC power. Since the flat-plate electrode 64 and the localized electrode 62 are asymmetric with each other, a non-uniformed electrical field 60 is formed. The localized electrode 62 and the flat-plate electrode 64 respectively take, for example, a positive level and a negative level, the electrical field lines of the electrical field 60 are non-uniformed, and the closer to the localized electrode 62, the stronger the electrical field is. For the dielectric particles able to produce a positive electrophoresis force (p-DEP force), the negative charge end thereof is closer to the localized electrode 62 and the positive charge end thereof is closer to the flat-plate electrode 64. Due to the difference of the electrical field intensity, an attractive force of the localized electrode 62 on the upper end has a direction shown by the bold arrow and is greater than the attractive force of the flat-plate electrode 64 on the lower end. As a result, the p-DEP particles move upwards.

Contrarily as shown by FIG. 1(*b*), for the dielectric particles able to produce a negative electrophoresis force (n-DEP force), the negative charge end thereof is closer to the flat-plate electrode 64 and the positive charge end thereof is closer to the localized electrode 62. At the time, a repulsion force of the localized electrode 62 on the upper end has a direction shown by the bold arrow and is greater than the rejective force of the flat-plate electrode 64 on the lower end. As a result, the n-DEP particles move downwards. In terms of an AC voltage, corresponding to the next phase of the electrical field, it is also a non-uniformed electrical field to move the dielectrophoretic particles. In this way, the dielectrophoretic particles can be separated and concentrated by means of the DEP force.

Although the DEP force has been used to detect trace particles and find its applications, but the project of how to more effectively concentrate the trace particles by using the DEP force is still being developed.

SUMMARY OF THE INVENTION

Accordingly, the present invention is directed to a dielectrophoretic particle concentrator and a concentration method, which is, for example, a 3-D dielectrophoresis device in association with detection electrodes and can be used at least in liquid specimen tests such as water quality test, blood test and urine test.

The present invention further provides a concentration method of dielectrophoretic particles. The method includes: providing a fluid pipe structure, wherein the fluid pipe structure has a protrudent structure lateral protruding inwardly so as to form a line-like gate; making a fluid containing particles to be measured flow through the fluid pipe structure; and applying an electrical field through the line-like gate so as to produce a dielectrophoresis force to concentrate the particles to be measured.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
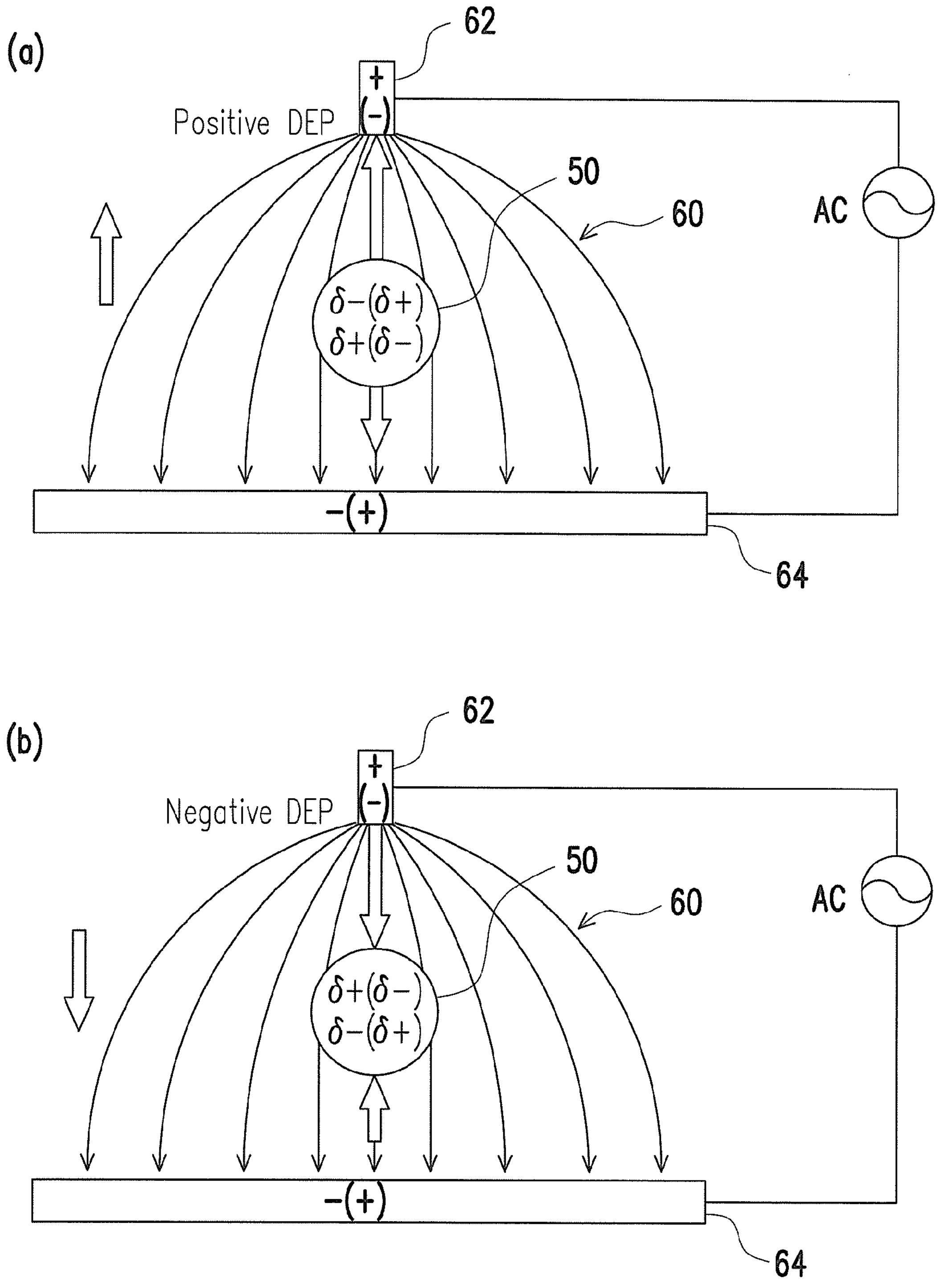
FIG. 1 (RELATED ART)
FIG. 1 is a diagram showing the dielectrophoresis mechanism (DEP mechanism).

Reference will now be made in detail to the present preferred embodiments of the invention, examples of which are illustrated in the accompanying drawings. Wherever possible, the same reference numbers are used in the drawings and the description to refer to the same or like parts.

The present invention provides a dielectrophoretic particle concentrator, having a structure, for example, of a concentrator in association with detection electrodes and further being designed in, for example, a 3-D layout of a dielectrophoretic device to reach a larger concentration region. The dielectrophoretic particle concentrator can be used in liquid specimen tests such as water quality test, blood test and urine test. Some of the embodiments of the present invention are described as follows, which the present invention is not limited to. In particular, the following-mentioned embodiments can be appropriately combined for applications.

Figure 2:
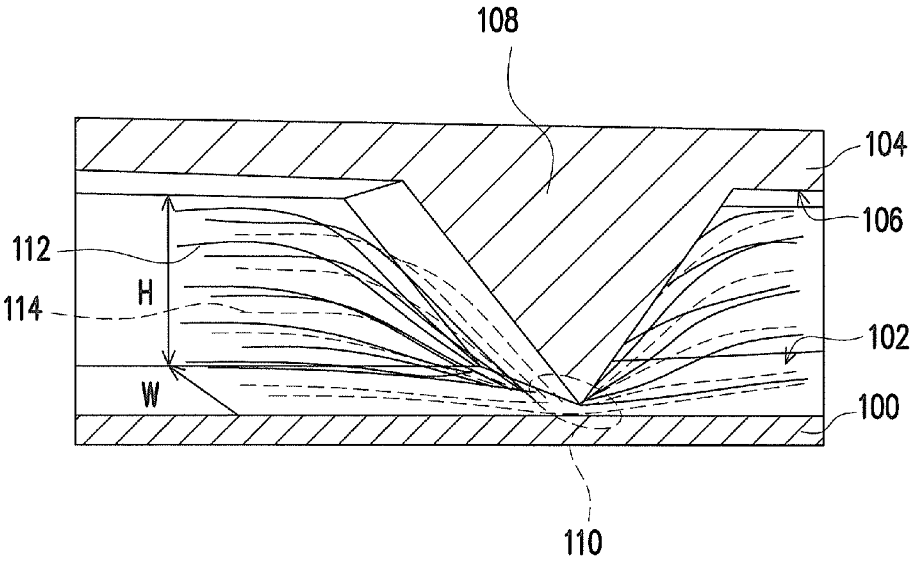
FIG. 2 is a diagram of a dielectrophoretic particle concentrator according to an embodiment of the present invention.

FIG. 2 is a diagram of a dielectrophoretic particle concentrator according to an embodiment of the present invention. Referring to FIG. 2, for a dielectrophoretic particle concentrator to produce a DEP force is to dispose a protrudent structure inside a fluid pipe to compress an electrical field so as to produce a DEP force. The dielectrophoretic particle concentrator has a structure comprising, for example, a lower substrate 100 and a upper substrate 104. The lower substrate 100 has a width W, for example, of 100 μm. The lower substrate 100 is spaced from the upper substrate 104 by a distance H, for example, of 300 μm. The upper substrate 104 has a protrudent structure 108 protruded towards the lower substrate 100. The protrudent structure 108 is, for example, a triangle-prism structure and the top-end 110 thereof is close to the surface 102 of the lower substrate 100. As a result, the surface 106 of the upper substrate 104 would form a line-like gate at the region of the top-end 110. When an electrical field 112 is applied on the above-mentioned structure along a direction from an end to another end thereof, the electrical field 112 would be compressed to produce electrical field gradients at the region of the top-end 110 of the protrudent structure 108 where the gate is located at and thereby to produce a DEP force. When a specimen fluid 114 flows through the line-like gate, as shown by the streamlines in FIG. 2, the trace particles to be measured would be concentrated at the region of the top-end 110 by the DEP force.

Figure 3:
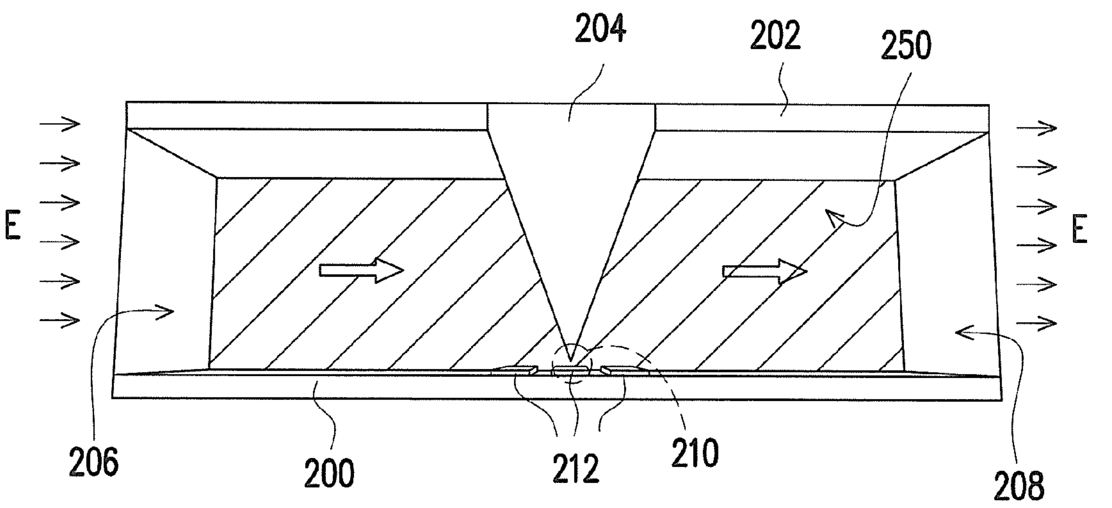
FIG. 3 is a 3-D sectional diagram of a dielectrophoretic particle concentrator according to an embodiment of the present invention.
Figure 4:
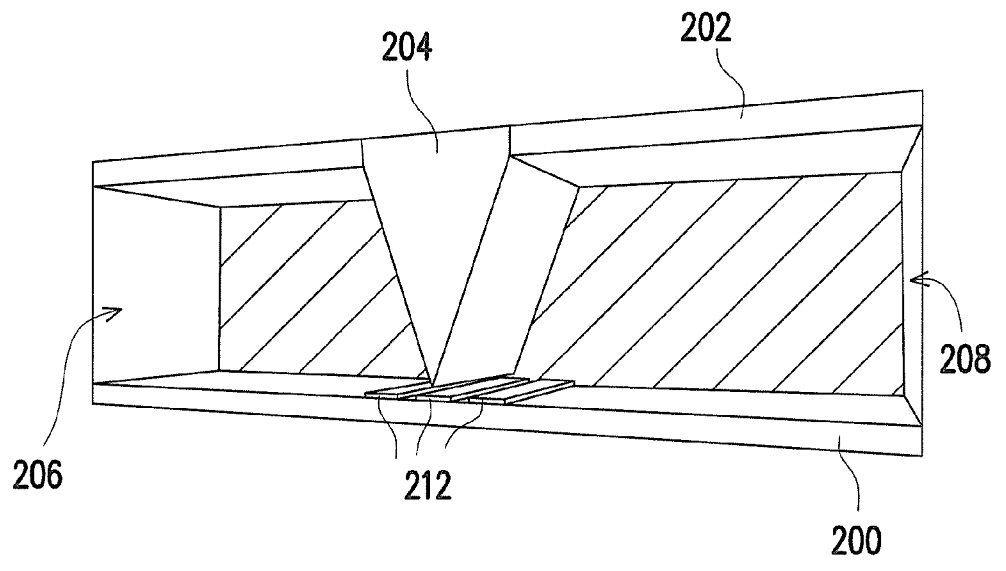
FIG. 4 is another 3-D sectional diagram of the dielectrophoretic particle concentrator of FIG. 3 after taking a rotation according to the above-mentioned embodiment of the present invention.

FIG. 3 is a 3-D sectional diagram of a dielectrophoretic particle concentrator according to an embodiment of the present invention. FIG. 4 is another 3-D sectional diagram of the dielectrophoretic particle concentrator of FIG. 3 after taking a rotation according to the above-mentioned embodiment of the present invention.

Referring to FIGS. 3 and 4, the 3-D front view diagrams show a dielectrophoretic particle concentrator in, for example, a right-angle pipe-like structure, and the sectional diagrams are obtained by sectioning the dielectrophoretic particle concentrator along the pipe-like structure. Taking the shown direction as an example, the substrate 200 functions the same as the lower substrate in FIG. 2, while the substrate 202 functions the same as the upper substrate in FIG. 2, wherein the protrudent structure 204 is for forming a gate at the tip region 210 so as to produce a DEP force. Two side walls 250 cover the side edges of the two substrates 200 and 202 so as to form a pipe-like structure, however in the sectional diagrams, only the inner surface of one of the side walls 250 can be seen. The specimen fluid flows from an inlet to an outlet or vice versa, as shown by the bold arrow in FIG. 3. The inlet 206 and the outlet 208 are the accesses of the pipeline, which can be implemented by usual design without a specifically required structure. In addition, a driving electrical field E is required to be applied in the arrow direction. In the embodiment, the driving electrical field can be produced by an electrical field generating device (not shown) disposed outside the pipe-like structure. As a result, a DEP force is produced at the tip region 210 of the protrudent structure 204, and thereby, the particles to be measured in the specimen fluid are concentrated at the place. In order to easily detect the particles to be measured in the specimen fluid, for example, a set of detection electrodes 212 are disposed on the substrate 200 under the tip region 210 corresponding to the protrudent structure 204. The detection electrodes 212 can detect whether or not the particles to be measured are concentrated at the region of the tip region 210 at any time. Anyone skilled in the art can use other auxiliary detection instruments to replace the above-mentioned detection electrodes 212 for detecting the particles to be measured.

In the embodiment, the protrudent structure 204 and the substrate 202 are an integrated structure, which means they are fabricated into, for example, a single structure or an adhered structure. In terms of the geometric shape of the protrudent structure 204, the section thereof is not limited to the triangle. Once the protrudent structure is designed to be able reaching the fluid gate and can produce the DEP force, the structure is acceptable. In other words, the substrate 200 can, for example, have another protrudent structure opposite to the protrudent structure 204 of the substrate 202, and the section shape of the pipe-like structure is not limited to the above-mentioned right-angle rectangular shape. For example, the pipe-like structure can be a round-pipe structure. In this way, the side wall 250 is integrated with the substrates 200 and 202.

Figure 5:
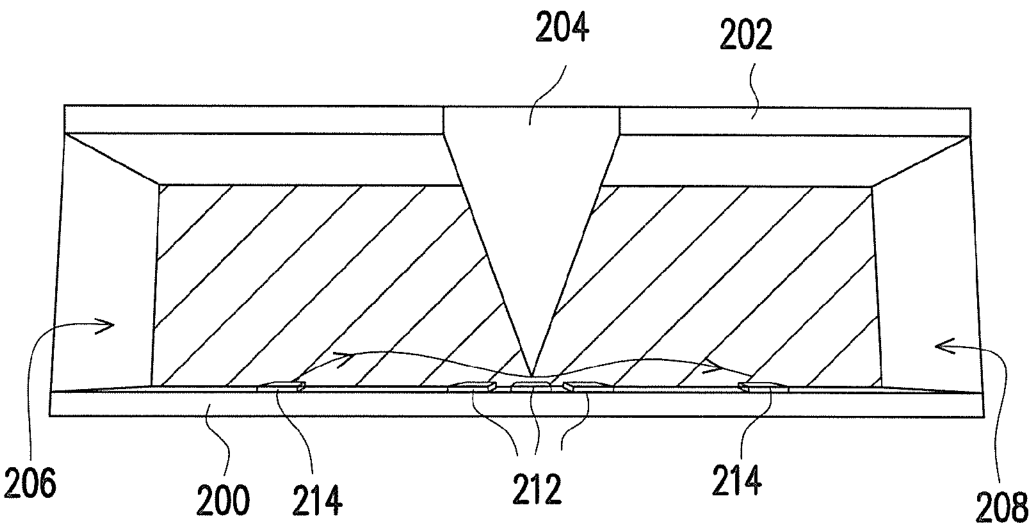
FIG. 5 is a 3-D sectional diagram of a dielectrophoretic particle concentrator according to an embodiment of the present invention.
Figure 6:
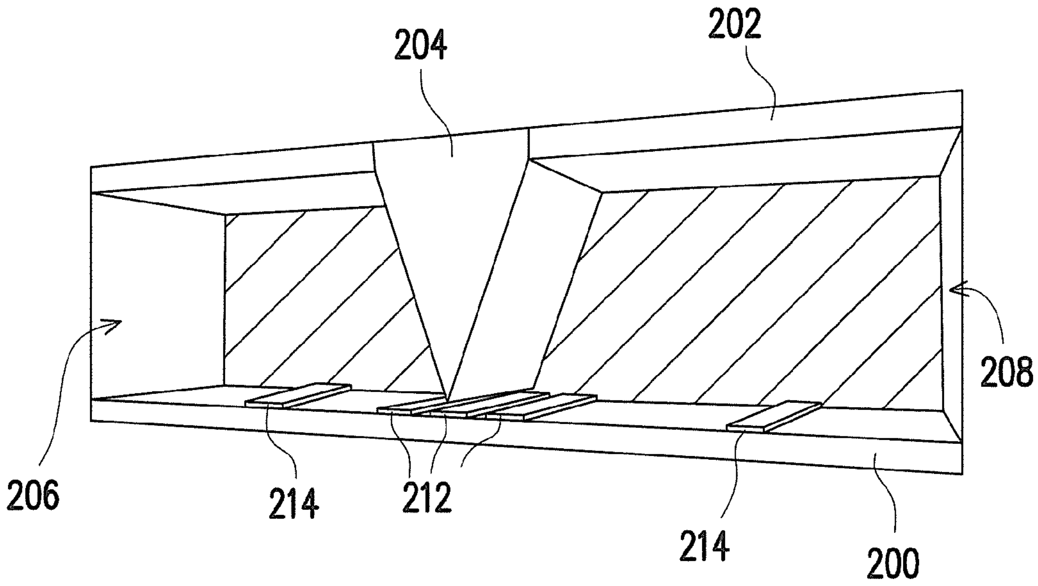
FIG. 6 is another 3-D sectional diagram of the dielectrophoretic particle concentrator of FIG. 5 after taking a rotation according to the above-mentioned embodiment of the present invention.

FIG. 5 is a 3-D sectional diagram of a dielectrophoretic particle concentrator according to an embodiment of the present invention and FIG. 6 is another 3-D sectional diagram of the dielectrophoretic particle concentrator of FIG. 5 after taking a rotation according to the above-mentioned embodiment of the present invention.

Referring to FIGS. 5 and 6, the dielectrophoretic particle concentrator herein is similar to the structure of FIGS. 3 and 4 except for the way of applying the electrical field. In the embodiment, a pair of driving electrodes 214 are further disposed on the substrate 200, which function as the driving electrodes to produce the electrical field, wherein the electrical field lines are along the directions as shown by the arrows in FIG. 5. The electrical field is non-uniform and thereby a DEP force is produced. In more details, since the tip of the protrudent structure 204 compresses the electrical field in association with the substrate 200 to form a shrunk gate and to allow a fluid to flow through the gate, the electrical field to be applied can be disposed nearby the gate and such design is advantageous in easily producing a DEP force with high intensity. The pair of driving electrodes 214 shown by FIGS. 5 and 6 can be directly fabricated on the substrate 200 so as to save an external electrical field generating device. The driving electrodes 214 are designed without specific limited structure, but it is required to follow the extending way of the tip of the protrudent structure 204; for example, it can be realized by bar-like driving electrodes designed following the shape of the protrudent structure 204. The driving electrodes 214 for driving can produce a DEP force at the tip region 210 of the protrudent structure 204 so as to concentrate the particles to be measured in the specimen fluid at the tip region 210. The driving electrodes 214 for driving can also produce an electroosmotic flow (EOF) in association with the protrudent structure 204. Under the case, the driving electrodes 214, for example drive the micro-particles to move towards a specific direction, so that the concentrated region of the protrudent structure 204 is not limited to the specific small region.

In general speaking, the dielectrophoretic particle concentrator can include, for example, a fluid pipe structure, which allows a fluid containing particles to be measured flowing through the fluid pipe structure. In the fluid pipe structure herein, a protrudent structure featuring lateral protruding is disposed so as to form a line-like gate. A set of detection electrodes are disposed at a pipe wall of the fluid pipe structure and adjacent to the line-like gate. In terms of the applying way of the electrical field, it can be either outside applying or inside applying.

In terms of the concentration method of dielectrophoretic particles, the method includes: providing a fluid pipe structure, wherein in the fluid pipe structure, there is a protrudent structure featuring lateral protruding so as to form a line-like gate; then, making a fluid containing particles to be measured flow through the fluid pipe structure; then, applying an electrical field through the line-like gate so as to produce a DEP force to concentrate the particles to be measured.

When the electrical field is applied, the step includes adjusting a voltage frequency so that the particles to be measured in the fluid move towards a specific direction in the fluid pipe structure, wherein the operation of adjusting the voltage frequency controls the concentrating, releasing and moving the particles to be measured. Remarkably, the electric field is adjusted by adjusting the voltage frequency, which means that a voltage, a frequency, or both are adjusted, for example.

Figure 7:
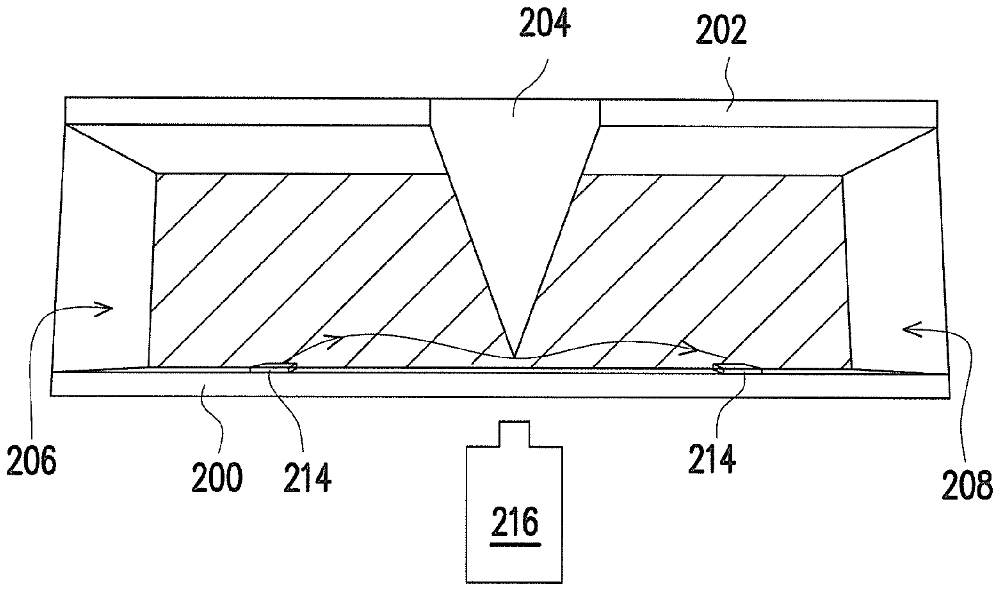
FIG. 7 is a diagram of a detection system comprising a dielectrophoretic particle concentrator in association with a pair of driving electrodes according to an embodiment of the present invention.

In terms of the method of detecting the concentrated particles, in addition to the above-mentioned detection electrodes, there is another way by using an optical detection device where the concentrated particles are detected from outside, wherein at least the detection region is a transparent region, but the substrate 200 can be also a transparent material as well. When using an optical detection device, the detection electrodes can be used together with the optical detection device or saved. FIG. 7 is a diagram of a detection system comprising a dielectrophoretic particle concentrator in association with a pair of driving electrodes according to an embodiment of the present invention.

Referring to FIG. 7, in the embodiment, for example, no detection electrodes are disposed, however, it can be that the detection electrodes are disposed on the substrate 200, which the present invention is not limited to. In the embodiment of FIG. 7, the mechanism of concentrating the particles still is used, but no detection electrodes are disposed on the substrate 200, and instead, an external optical detection device 216 is employed to conduct detection.

Figure 8:
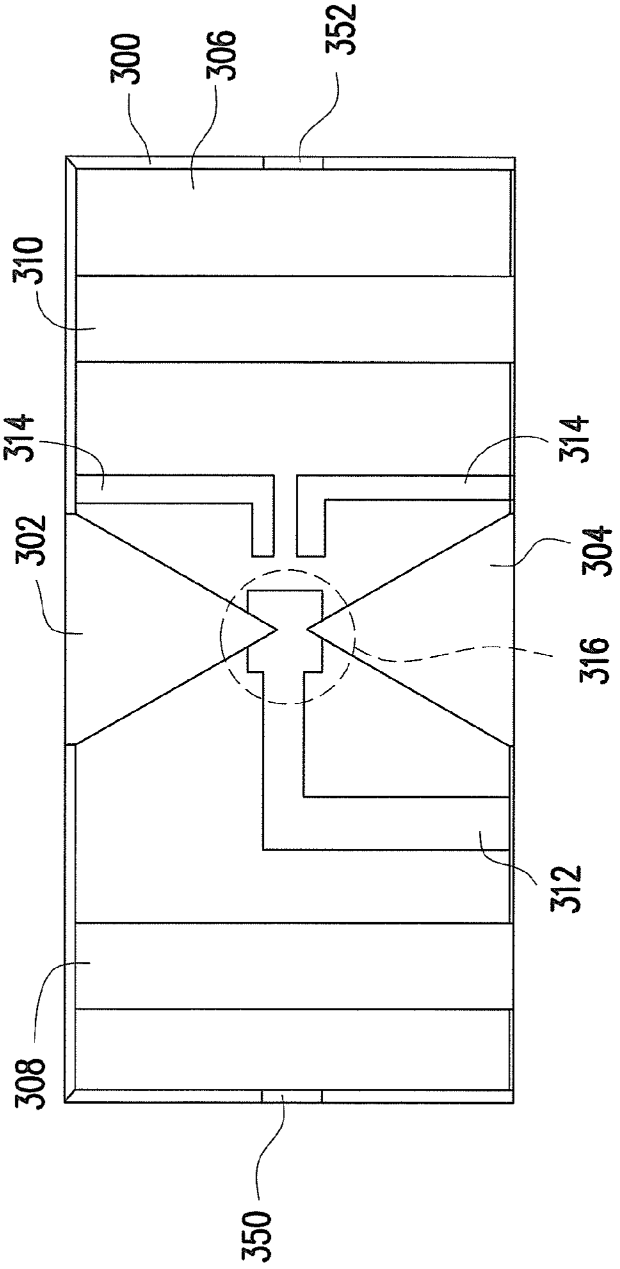
FIG. 8 is a 3-D top-view sectional diagram of a dielectrophoretic particle concentrator according to the above-mentioned embodiment of the present invention.

In the above-mentioned embodiment, the particles to be measured in the fluid are concentrated in a line-like region so as to be more easily concentrated. In other embodiments, the particles to be measured in the fluid can be concentrated in a point-like region. FIG. 8 is a 3-D top-view sectional diagram of a dielectrophoretic particle concentrator according to the above-mentioned embodiment of the present invention and FIG. 9 is another 3-D sectional diagram of the dielectrophoretic particle concentrator of FIG. 8 after taking a rotation according to the above-mentioned embodiment of the present invention.

Figure 9:
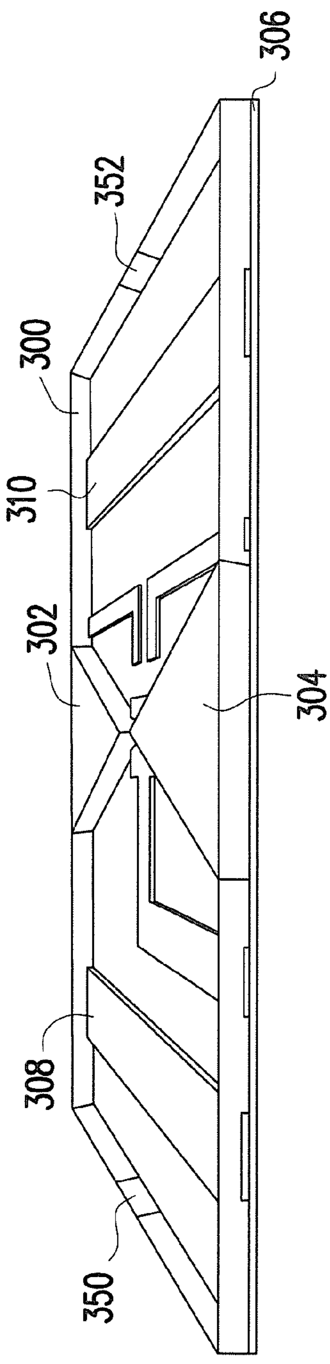
FIG. 9 is another 3-D sectional diagram of the dielectrophoretic particle concentrator of FIG. 8 after taking a rotation according to the above-mentioned embodiment of the present invention.

Referring to an embodiment of FIGS. 8 and 9, a dielectrophoretic particle concentrator includes a substrate 306, an edge wall structure 300, two dielectric layers 302 and 304 and a pair of driving electrodes 308 and 310. The edge wall structure 300 is disposed on the substrate 306 to form a fluid accommodation space. The dielectric layer 302 is disposed on the substrate 306 and integrated with the edge wall structure 300. The dielectric layers 302 and 304 respectively have a tip, and the two tips are opposite to each other to form a gate region 316. The driving electrodes 308 and 310 are disposed on the substrate 306 and located at both sides of the dielectric layer 302, wherein when an operating voltage is applied between the pair of driving electrodes 308 and 310, an electrical field is produced. The electrical field is compressed at the gate to produce a DEP force, and the particles to be measured in the specimen fluid are concentrated at the gate region 316. A set of detection electrodes 312 and 314 can be disposed on the substrate 306 for detecting the concentration of the particles to be measured concentrated at the gate region 316. Moreover, an inlet 350 and an outlet 352 are disposed at the edge wall structure 300 so as to allow a specimen fluid flowing through. The inlet and the outlet can be designed according to the practice. If it is needed, for example, another substrate can be employed to overlay on the edge wall structure 300.

In the embodiment, the two dielectric layers 302 and 304 are integrated with the edge wall structure 300 so as to form a gate region 316; however, it can be designed to have only one dielectric layer 302 to form the gate, where the dielectric layer 302 extends to the edge wall structure 300. At the time, the edge wall structure 300 at a place corresponding to the dielectric layer 302 can be a flat surface, which has, for example, a geometric structure of the protrudent structure 204 and the substrate 200 in FIG. 4.

The electrical field of the embodiment is realized by using a pair of driving electrodes 308 and 310. Since the electrical field can be applied at a place close to the gate, which can be advantageous in, for example, simplifying the entire system, facilitating the control of the DEP force and the detection of the particles to be measured.

Figure 10:
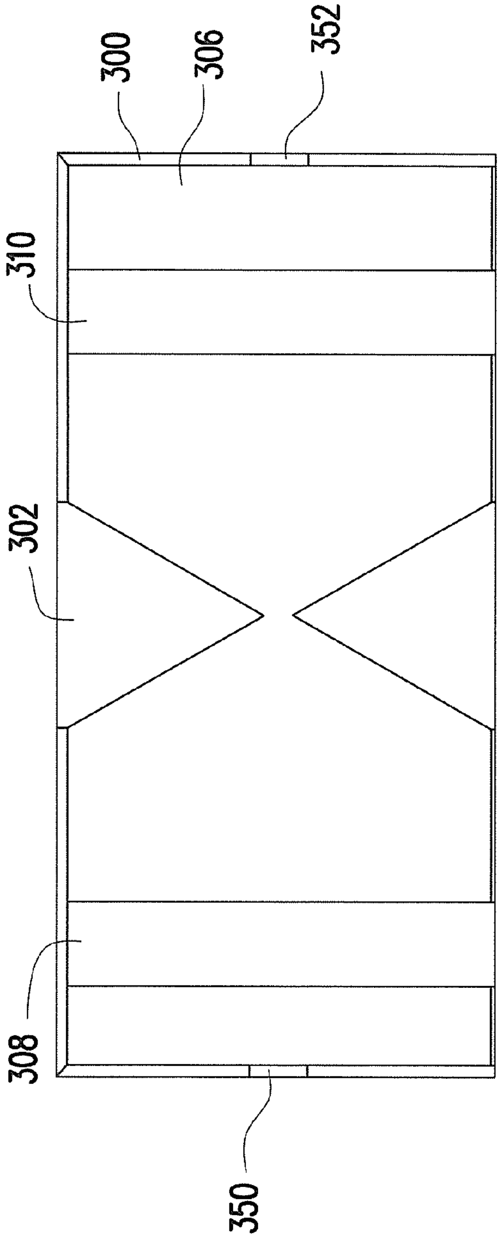
FIG. 10 is a 3-D top-view sectional diagram of a dielectrophoretic particle concentrator according to an embodiment of the present invention.
Figure 11:
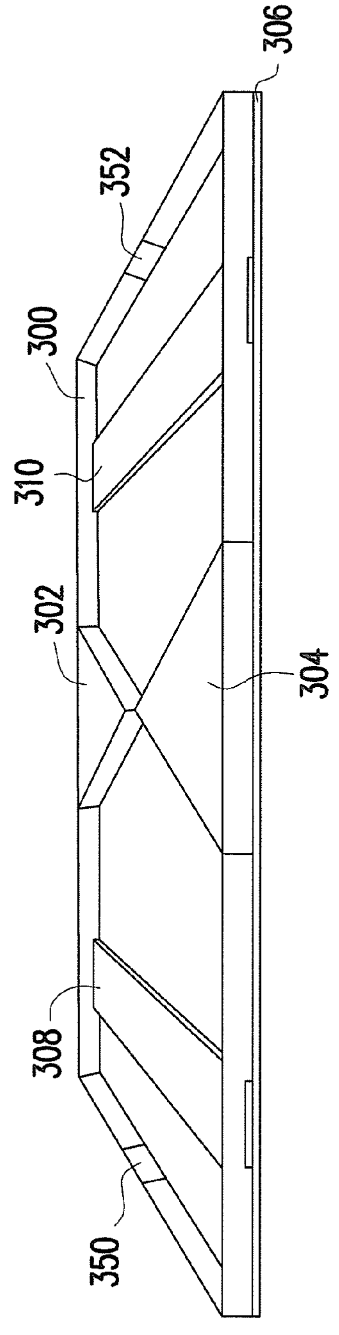
FIG. 11 is another 3-D sectional diagram of the dielectrophoretic particle concentrator of FIG. 10 after taking a rotation according to the above-mentioned embodiment of the present invention.

FIG. 10 is a 3-D top-view sectional diagram of a dielectrophoretic particle concentrator according to an embodiment of the present invention and FIG. 11 is another 3-D sectional diagram of the dielectrophoretic particle concentrator of FIG. 10 after taking a rotation according to the above-mentioned embodiment of the present invention.

Referring to FIGS. 10 and 11, the structure herein is similar to the one of FIGS. 8 and 9, but without disposing the detection electrodes. To detect the concentrated particles to be measured, an external instrument is employed. In other words, the detection electrodes can be disposed according to the practice.

Figure 12:
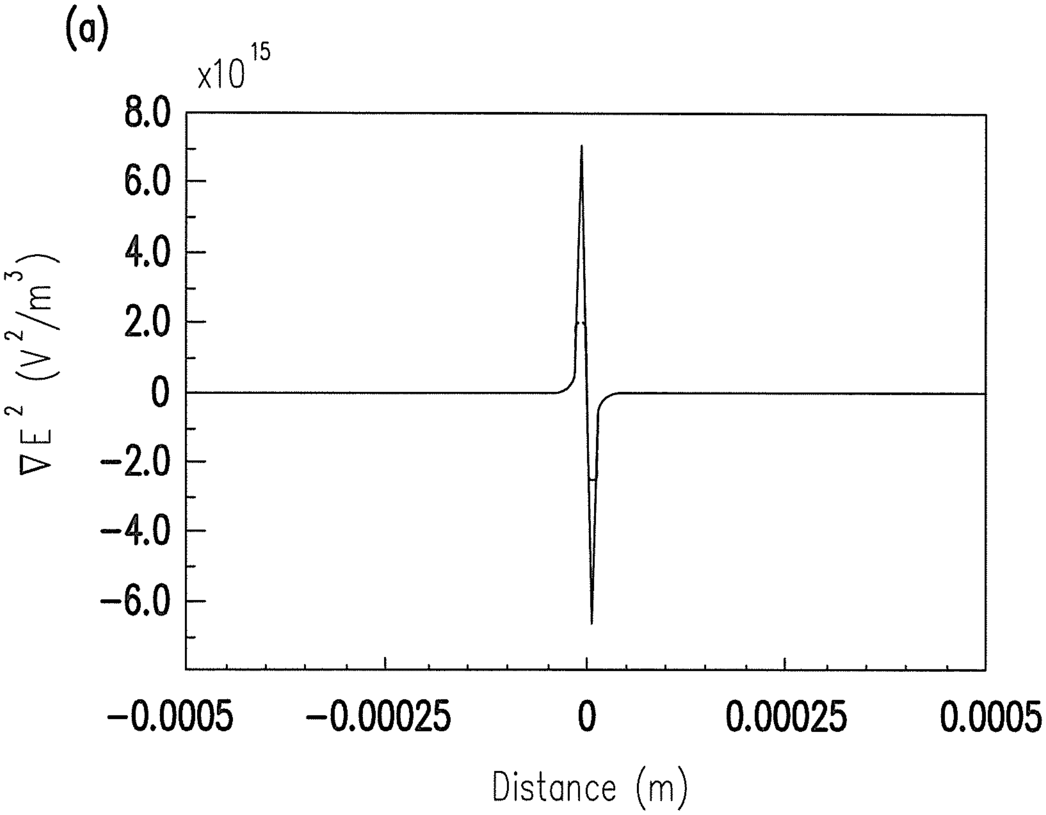
FIG. 12 is a drawing, schematically illustrating a simulation result corresponding to FIG. 2, according to an embodiment of the present invention.
Figure 12:
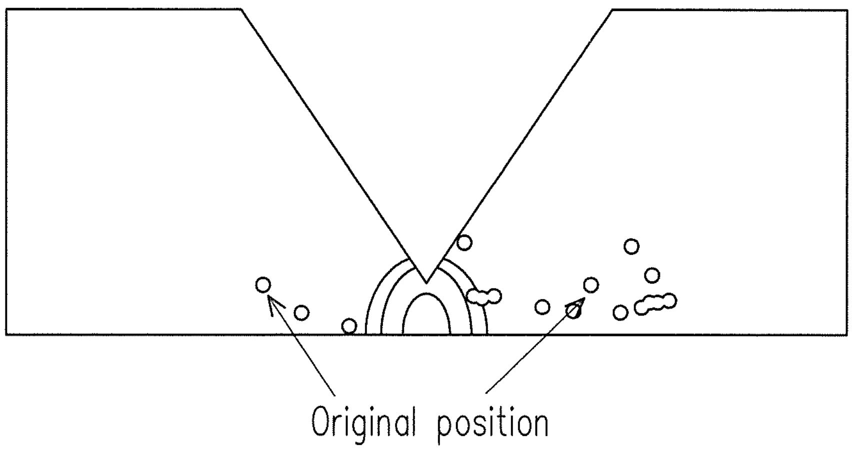

Some simulation results are provided to the improvements. FIG. 12 is a drawing, schematically illustrating a simulation result corresponding to FIG. 2, according to an embodiment of the present invention. In FIG. 12(*a*), based on the structure shown in FIG. 2, the gradient of the electric intensity near the gap of the structure at the top-end 110 is greatly changing, causing strong DEP force. In FIG. 12(*b*), the particles at the original positions are concentrated to the region near the top-end 110, as shown in contouring lines in concentration difference.

Figure 13:
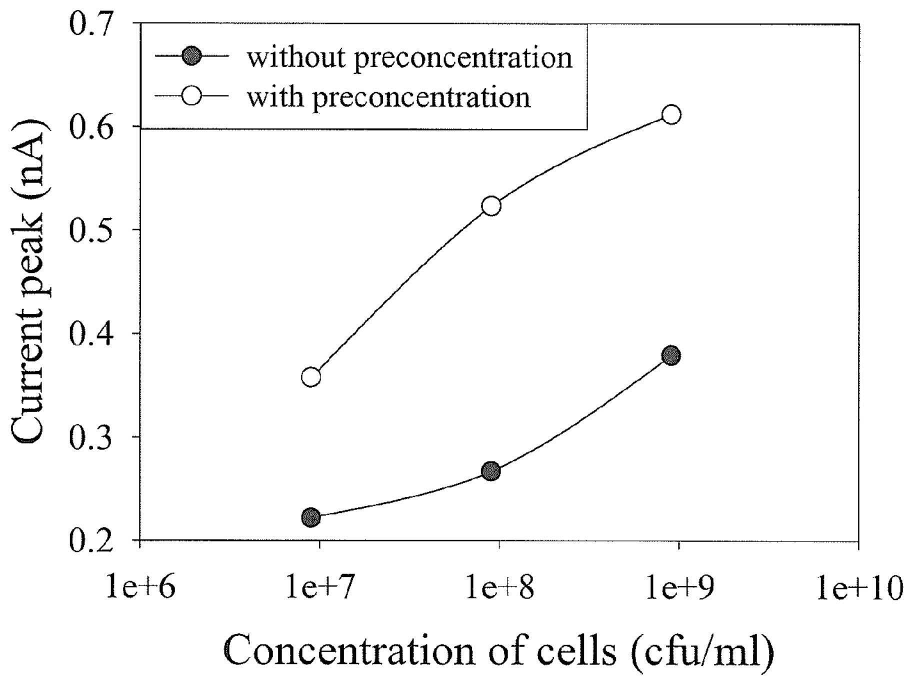
FIG. 13 is a drawing, schematically illustrating experiment results corresponding to FIG. 8, according to an embodiment of the present invention.

FIG. 13 is a drawing, schematically illustrating experiment results corresponding to FIG. 8, according to an embodiment of the present invention. In FIG. 13, a simulation result according to the structure in FIG. 8 shows the improvements in concentrating the particles. The solid dots represent the concentration without the pre-concentration effect by the protrudent structure for forming the gap. The open dotes represent the concentration under the same operation conditions but with the pre-concentration effect by the protrudent structure for forming the gap. The concentration can be indeed improved.

Figure 14:
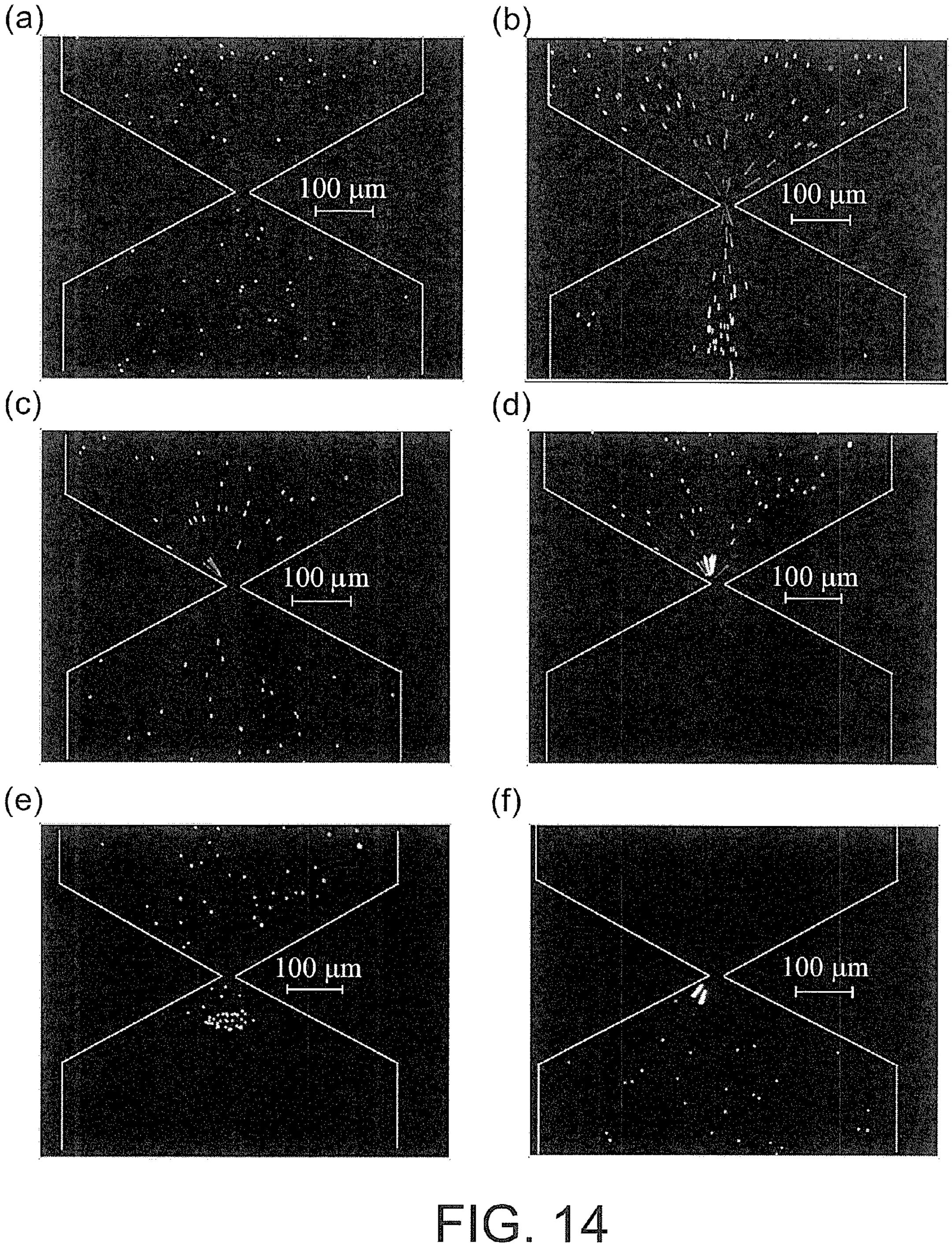
FIG. 14 is a drawing, schematically illustrating experiment results corresponding to FIG. 10, according to an embodiment of the present invention.

FIG. 14 is a drawing, schematically illustrating experiment results corresponding to FIG. 10, according to an embodiment of the present invention. In FIG. 14(*a*), the driving electrodes are applied with voltages to produce the electric field. When at the constant voltage but in different frequency, particles can have a specific flowing pattern under different operation frequency. Therefore, the frequency can be used to control the direction of the electroosmotic flow (EOF). This is helpful to cause the DEP to be greater than the EOF on the particles, which pass the gap and are trapped in condensed concentration at the gap.

The particles are, for example, 1.0 μm in diameter inside the microchannel under interdependent effects between electroosmotic (EO) force and DEP force. In FIG. 14(*a*), particles are under Brownian motions in the original equilibrium when the electric field is off. FIG. 14(*b*) shows the EO conveyance of particles at the frequency of 120 Hz when the field is 200 V/cm. FIG. 14(*c*) shows the DEP trapping under the EO flow at the frequency of 200 Hz. FIG. 14(*d*) shows the particle enrichment by the continuous EO flow as time increased. FIG. 14(*e*) shows the particle release at the frequency of 250 Hz where DEP force is weaker than EO force. FIG. 14(*f*) shows the re-trapping of particle at the frequency of 320 Hz under the reversed EO backflow. The white lines depict the boundary of insulating structures.

At this condition, the particles at the other side of microchannel also can be collected under the upward EO flow. This phenomenon shows that the direction of the EO flow can be manipulated just by tuning the frequency of the electric field. The bi-directional particle trapping can be achieved. This trapping mechanism may provide a more efficient concentration method, and even may collect whole particles in a microchannel.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention.

What is claimed is:

1. A method of concentrating dielectrophoretic particles, comprising:

providing a fluid pipe structure, wherein the fluid pipe structure has a first wall, a second wall, a third wall and a fourth wall, wherein the first wall is parallel to the third wall, and both end sides of each of the second wall and the fourth wall are respectively on the first wall and the third wall, a protrudent structure forms a line structure and is lying on the first wall and is protruding inwardly toward the third wall so as to form a line-like gate, wherein both ends of the protrudent structure are respectively on the second wall and the fourth wall;

making fluid containing particles to be measured to flow through the fluid pipe structure;

applying an electrical field through the line-like gate so as to produce a dielectrophoresis force to concentrate the particles to be measured, wherein the electrical field is applied by disposing a pair of electrodes on the third wall of the fluid pipe structure at two sides of the line-like gate and the pair of electrodes is parallel to a longitudinal direction of the line-like gate, wherein both ends of each of the pair of electrodes are respectively on the second wall and the fourth wall; and detecting the concentrated particles to be measured by disposing a detection electrode on the third wall inside the fluid pipe structure under the line-like gate corresponding to the protrudent structure, wherein the detection electrode comprises a set of line electrodes being parallel with the line-like gate.

2. The method of concentrating dielectrophoretic particles as claimed in claim 1, wherein the step of applying the electrical field comprises applying the electrical field from a first electrode of the pair of electrodes to a second electrode of the pair of electrodes.

3. The method of concentrating dielectrophoretic particles as claimed in claim 1, wherein the step of applying the electrical field comprises adjusting a voltage, a frequency, or both the voltage and the frequency, so that the particles to be measured move towards a specific direction in the fluid pipe structure, wherein an operation of adjusting the voltage, the frequency or both the voltage and frequency controls the concentrating, releasing and moving the particles to be measured.

4. The method of concentrating dielectrophoretic particles as claimed in claim 1, wherein the step of detecting the concentrated particles to be measured further comprises disposing an optical detection device at a place outside the fluid pipe structure corresponding to the line-like gate for conducting an optical detection.

* * * * *